United States Patent Office 3,036,995
Patented May 29, 1962

3,036,995
SULFONE-MODIFIED POLYETHYLENE
TEREPHTHALATE
Christian F. Horn, New York, N.Y., assignor to Union
Carbide Corporation, a corporation of New York
No Drawing. Filed Oct. 7, 1957, Ser. No. 688,394
27 Claims. (Cl. 260—75)

This invention relates to novel polyethylene terephthalate compositions and to a method for preparing such compositions. The compositions of the invention are unique, as compared with polyethylene terephthalates heretofore proposed, in possessing superior dyeability while retaining excellent thermal stability.

U.S. Patent 2,465,319 to Whinfield and Dickson describes several methods for preparing highly polymeric linear polymethylene terephthalates. One of these involves heating a lower alkyl terephthalate such as methyl, ethyl, propyl, butyl, amyl, hexyl and heptyl terephthalates with a polymethylene glycol under conditions producing ester interchange and the formation of a corresponding glycol terephthalate which, upon further heating to a temperature above its melting point polymerizes into a highly polymeric linear polyester until a stage is reached at which filaments formed from the mass possess cold-drawing properties. The polymerization or polycondensation may, if desired, be carried out in the presence of a catalyst. When ethylene glycol is the glycol used in its preparation, the highly polymeric linear ethylene terephthalate so produced has recurring structural units of the formula

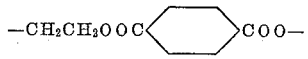

Polyethylene terephthalates have met with very considerable commercial success. They form tough fibers and sheets having melting points of the order of about 258 to 263° C. and are noted for their insolubility, high crystallinity, tensile strength, pliability, cold-drawing properties and resistance to water. Unfortunately, however, polymeric ethylene terephthalate is extremely difficult to dye. Thus, while polyethylene terephthalate fibers possess many of the most desirable characteristics required for textile applications, their impermeability to water and the consequent difficulty, in some instances impossibility, of dyeing fabrics therefrom by the ordinary dyeing procedures used for cotton, wool, natural silk, regenerated cellulose, nylon, and the like, has undoubtedly kept polyethylene terephthalates from achieving greater commercial acceptance.

It was to be expected that many efforts would be made to improve the dyeability of a film- and filament-forming material having as many desirable characteristics as those possessed by polyethylene terephthalate. Such efforts have indeed been made. Unfortunately, however, the efforts that have resulted in some degree of success in making polyethylene terephthalate more dyeable have done so only at the expense of degrading the polymer substantially with respect to its other characteristics. Thus, for example, a reported effort to improve the dyeability of polyethylene terephthalate by incorporating within its structure minor amounts of certain amino alcohols and thereby giving the polymer a greater ability to absorb acetate dyes and acid dyes, seriously reduces the heat stability of the polyethylene terephthalate so modified. Another effort in this direction involved chemical incorporation of long chain polyalkylene oxides having molecular weights of the order of 1000 to 6000. This modification of the polyethylene terephthalate unfortunately made it quite sensitive to air oxidation and to light. Another proposal involved the utilization of toxic carriers such as the chlorobenzenes, chlorophenols, and the like, for the dyeing process. Still another involved the application of vat or acetate dyes under superatmospheric pressure at temperatures above 100° C. Another required the use of fiber swelling agents or dye carriers. Still another involved the use of pigments that are mixed directly with the polyethylene terephthalate melt before spinning.

It is apparent that these efforts have had no or very limited success. The methods involving chemical incorporation of modifying agents such as amino alcohols polyalkylene oxides have involved substantial reduction in thermal stability, the use of toxic carriers is inherently undesirable and dangerous, and special dyeing techniques, such as those requiring dyestuffs that are stable at high temperatures, are too expensive to be commercially practicable.

These difficulties have now been overcome without significantly impairing the characteristics of polyethylene terephthalate. Thus, for example, polyethylene terephthalate fibers and films made in accordance with the method of this invention are readily dyeable by ordinary dyeing techniques while at the same time retaining excellent heat stability, dimensional stability and strength.

In accordance with the invention, polymeric ethylene terephthalate is modified by incorporating within the molecule a minor proportion of structural units having the formula

—OOCRSO$_2$R′SO$_2$RCOO— in which the Rs and R′ are divalent hydrocarbon radicals containing from two to ten carbon atoms. This is preferably accomplished by carrying out the reaction of a lower alkyl terephthalate and ethylene glycol with a minor amount of disulfone.

In a preferred embodiment of the method of the invention, a dialkyl terephthalate is mixed with ethylene glycol and a minor proportion of disulfone. The mixture is heated and reacted under conditions producing ester interchange as described in Patent 2,465,319 and then further heated for polycondensation or copolymerization of the monomers until a highly polymeric, linear ethylene terephthalate modified by occasionally recurring disulfone units is formed.

The alkyl terephthalate monomer initially employed may be any of the lower alkyl esters of terephthalic acid which, upon undergoing ester interchange with ethylene glycol, forms an alcohol that has a boiling point below about 200° C. Dimethyl terephthalate is preferred because of its ready availability and the low boiling point of methyl alcohol produced as a by-product during the ester interchange reaction.

The disulfones that are suitable for use in modifying polyethylene terephthalate in accordance with the invention are those having the general formula

R′[SO$_2$RCOOR″]$_2$ in which the Rs and R′s are divalent hydrocarbon radicals containing from two to ten carbon atoms and the R″s are alkyl radicals which also form alcohols having boiling points below about 200° C. when the sulfone undergoes ester interchange with ethylene glycol. The Rs are preferably polymethylene, para-phenylene 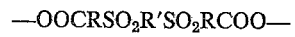

or para-tolylene 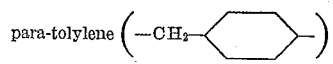

radicals, R′ is preferably a straight or branched chain alkylene radical or xylylene, and the R″s are preferably lower alkyl radicals. Optimum results have been obtained with sulfones in which the R″s are methyl.

The disulfones are capable of being prepared in several ways. One involves reacting a dichloride R'Cl$_2$ with a mercapto acid HSRCOOH to form the corresponding dithiodicarboxylic acid, oxidizing the dithio acid to the corresponding disulfone acid, and esterifying the latter with an alcohol R"OH to the corresponding diester. Thus, for example, dimethyl 6,6'-(tetramethylenedisulfonyl)dicaproate can readily be prepared by reacting 1,4-dichlorobutane with 6-mercaptocaproic acid, or the dimethyl ester thereof, to form 6,6'-(tetramethylenedithio)dicaproic acid (or the dimethyl ester thereof), oxidizing with a suitable oxidizing agent such as peracetic acid to the corresponding disulfone compound and, if necessary, esterifying the disulfone dicarboxylic acid to the dimethyl acid. Another method that is suitable particularly when the Rs are tri-, tetra-, or pentamethylene radicals, involves reaction of a dithiol R'(SH)$_2$ with a butyro-, valero-, or caprolactone or the corresponding omega halogen acids to form a dithiocarboxylic acid, and the oxidizing and esterifying as described earlier.

It will readily be apparent from a consideration of the ultimate structure of the modified polyethylene terephthalates of the invention in whis terephthalate and ethylene glycol residues are conjugated to form long chains, a terephthalate residue being occasionally replaced by a sulfone residue, that ethylene glycol must be used in a molar amount that is at least equal to the combined molar amounts of terephthalate and sulfone. For practical considerations, the minimum molar amount of ethylene glycol should be at least about twice the combined molar amount of terephthalate and sulfone. The preferred ratio is within the range of about three to ten times this amount. A greater excess of ethylene glycol does not by any means make the method inoperable but is not preferred because it serves no useful purpose and simply increases the amount of ethylene glycol that must be recovered in the polycondensation reaction.

The proportion of sulfone in the reaction mix is minor compared to the proportions of terephthalate and ethylene glycol. It should be at least sufficient significantly to improve the dyeability of the ultimate polymer yet not so great as to reduce its melting point too much. While effects may vary somewhat depending upon the particular sulfone that is used, it is generally desirable to limit the proportion of sulfone in the polymer to between about 2 and 10 mol percent based on the amount of total esters. It is to be understood of course that if less dyeability is required it is permissible to depart from this range by utilizing less than about 2 mol percent and that if melting points below about 230° C. are not considered a disadvantge, the sulfone content may be increased above the maximum specified.

The ester interchange can be effected at temperatures within the range of about 100 to 200° C., preferably about 160 to 185° C., and may be accelerated by the use of any one or combination of the well known ester interchange catalysts such as calcium, sodium, dibutyltin oxide, tributyltin hydroxide, dilauryltin oxide, lead borate, lead salicylate, lead benzoate, lead carbonate, lead acetate, dibutyltin dichloride, or the like. It is advantageous to perform the ester interchange under conditions that minimze oxidation and assist in removing alcohol that is first formed as a by-product and then removing excess glycol, e.g., by working at atmospheric or superatmospheric pressure while forcing or bubbling an inert gas such as nitrogen through the melt or by carrying out the ester interchange under subatmospheric pressure.

When the ester interchange is complete, as will be evident by a reduction in the rate of formation of alcohol, the reaction mix is subjected to polycondensation by further heating at a somewhat higher temperature within the range of about 200 to 300° C., preferably about 270 to 280° C. This polycondensation step can also be performed by the vacuum technique or by forcing an inert gas such as nitrogen through the melt and further by using one or more polycondensation catalysts. It is continued until filaments formed from the mass possess the property of cold-drawing.

A primary advantage of the invention is that shaped structures such as filaments, films, and the like, of polymeric ethylene terephthalate are dyeable to deep shades by conventional dyeing techniques and dyestuffs. Another important advantage is that dye dispersing agents and swelling agents are unnecessary for dyeing fibers made from polyethylene terephthalate modified in accordance with the invention. Still another advantage is that the ready dyeability of the modified polyethylene terephthalate is obtainable without significant sacrifice of such other important characteristics as heat stability, strength and cold-drawing ability.

These and other advantages, as well as the utility of the method and products of the invention, will become further apparent from the following detailed examples included to illustrate the best modes now contemplated of carrying out the invention. In these examples, the parts are by weight (p.b.w.) and reduced viscosity, used as a measure of the degree of polymerization, is defined as $$I_R = \frac{\left(\frac{\Delta N}{N_0}\right)}{C}$$

in which $\Delta N$ is the difference between flow time of solution and flow time of solvent, $N_0$ stands for flow time of solvent and C is the concentration of the polymer in grams per 100 cc. of solution. Reduced viscosity values were obtained at 47° C. in Examples 1 to 10 and at 30° C. in Examples 11 to 22, the solvent was a 3:2 mixture of phenol and tetrachloroethane, and the concentration of the polymer in the solution was 0.2 gram/100 cc.

*Example 1*

50 p.b.w. dimethyl terephthalate, 2.75 p.b.w. (2.35 mol percent total esters) dimethyl 6,6'-(tetramethylenedisulfonyl)dicaproate and 50 p.b.w. ethylene glycol were charged with 0.01 p.b.w. lead silicate into a vessel suitable for operation at pressures slightly above atmospheric and equipped with an agitator and diffuser at the bottom for introduction of nitrogen. An ester exchange reaction was carried out at 175° C. with continuous removal of methanol by passing a slow nitrogen stream through the melt. After termination of the methanol distillation, the temperature was raised to 250 to 280° C. to distill over excess ethylene glycol. Polycondensation of the reactants was then performed at 275° C. for six hours while passing a vigorous nitrogen stream through the melt.

A white polymer was obtained having a reduced viscosity of 0.61. It was readily extrudable into fibers which exhibited excellent cold-drawing properties. A piece of fabric knitted from these fibers showed excellent dye receptivity.

*Example 2*

50 p.b.w. dimethyl terephthalate, 4.2 p.b.w. (3.56 mol percent total esters) dimethyl 6,6'-(tetramethylenedisulfonyl)dicaproate and 50 p.b.w. ethylene glycol were charged to a condensation vessel with 0.03 p.b.w. sodium and 0.3 p.b.w. trioctyltin monochloride. After the initial ester exchange at 185° C., the mixture was heated at 280° C. for eight hours under a nitrogen atmosphere.

The resin obtained was white, fiber-forming, melted at 256 to 258° C. and had a reduced viscosity of 0.59. The fibers could be stretched several hundred percent.

*Example 3*

150 p.b.w. dimethylterephthalate, 12.8 p.b.w. (3.62 mol percent total esters) dimethyl 6,6'-(tetramethylenedisulfonyl)dicaproate and 150 p.b.w. ethylene glycol were charged to a condensation vessel with 0.1 p.b.w. sodium and 0.15 p.b.w. calcium dissolved in ethylene glycol. After the initial ester exchange reaction at 185° C., conducted according to Example 1, was terminated, the temperature was raised to and maintained at 280° C. for eleven hours while a vigorous stream of nitrogen was passed through the melt.

The resulting resin had a reduced viscosity of 0.58 and melted at 254 to 255° C. It was white and had excellent fiber-forming properties. The strength of the fibers was 4.0 g./denier after being stretched 460% at 75° C. A dyed, knitted fabric from these fibers showed considerable improvement in dye receptivity over polyethylene terephthalate.

Example 4

48 p.b.w. dimethyl terephthalate, 50 p.b.w. ethylene glycol and 5.5 p.b.w. (4.77 mol percent total esters) dimethyl 6,6'-(tetramethylenedisulfonyl)dicaproate were charged to a condensation vessel equipped at the bottom for introduction of finely dispersed nitrogen with 0.05 p.b.w. sodium and 0.05 p.b.w. diphenyltin dilaurate. The initial ester exchange reaction was carried out over a period of 2.7 hours at 185° C. with continuous removal of methanol in a slow nitrogen stream. After removal of the methanol, the temperature was raised to 250 to 260° C. to distill over excess ethylene glycol, a moderate flow of nitrogen again being used. The nitrogen stream was then increased considerably while the mixture was heated at 275° C. for five hours.

The resulting polymer was white and possessed excellent fiber-forming and cold-drawing properties. It had a reduced viscosity of 0.70 and melted at 250 to 252° C.

Example 5

48 p.b.w. dimethyl terephthalate, 5.5 p.b.w. (4.77 mol percent total esters) dimethyl 6,6'-(tetramethylenedisulfonyl)dicaproate and 50 p.b.w. ethylene glycol were charged to a condensation vessel with 0.029 p.b.w. calcium, 0.007 p.b.w. tetraphenyltin and 0.014 p.b.w. lead benzoate. After two hours of initial ester exchange at 185° C., the polycondensation reaction was carried out for seven hours at 275° C. according to the procedure described in Example 1.

The resulting resin was white and gave fibers exhibiting good cold-drawing properties. It melted at 248 to 250° C. and had a reduced viscosity of 0.61.

Example 6

194 p.b.w. dimethyl terephthalate, 22.6 p.b.w. (4.85 mol percent total esters) dimethyl 6,6'-(tetramethylenedisulfonyl)dicaproate and 200 p.b.w. ethylene glycol were charged into a condensation vessel with 0.18 p.b.w. calcium and 0.15 p.b.w. sodium. When the initial ester exchange at 185° C. was terminated, the temperature was raised to and maintained at 270° C. for approximately 10.5 hours while a vigorous stream of nitrogen was passed through the melt.

The resulting copolymer had a reduced viscosity of 0.74 and a melting point of 254° C. The resin was white and could be readily extruded into strong fibers. A fabric knitted from the fibers was dyed with the dispersed acetate dye "Eastone Fast Red GLF" for two hours at 100° C., using neither a swelling agent nor dye assistants. Dye exhaustion of the dye bath was 72% as compared with only 30% for unmodified polyethylene terephthalate under the same conditions.

Example 7

Five mol percent dimethyl 4,4'-(tetramethylenedisulfonyl)dibutyrate were copolymerized with dimethyl terephthalate and ethylene glycol in the manner described in Example 3.

The copolyester obtained was light in color and exhibited excellent fiber-forming and cold-drawing properties. The dye receptivity was approximately twice that of unmodified polyethylene terephthalate and deep shades were obtainable on pieces of knitted fabric without using carriers or high temperature dye techniques. The melting point was about 245° C.

Example 8

140 p.b.w. dimethyl terephthalate, 11.6 p.b.w. (4 mol percent total esters) diemethyl 4,4'-(tetramethylenedisulfonyl)dibutyrate and 150 p.b.w. ethylene glycol were charged to a condensation vessel with 0.14 p.b.w. calcium and 0.14 p.b.w. sodium dissolved in ethylene glycol. The melt was then raised to and maintained at a temperature of 275° C. for eleven hours while passing a vigorous stream of nitrogen through the melt.

The resulting resin was light in color and had excellent fiber-forming and cold-drawing properties, a melting point of 247° C. and a reduced viscosity of 0.72.

A piece of fabric knitted from the fibers of this resin was dyed under the same conditions as described in Example 6. Dye exhaustion of the dye bath was 71.4% as compared with only 30% for unmodified polyethylene terephthalate under the same conditions.

Example 9

131 p.b.w. dimethyl terephthalate, 20 p.b.w. (5.7 mol percent total esters) dimethyl 6,6'-(para-xylylenedisulfonyl)dicaproate and 150 p.b.w. ethylene glycol were charged into a condensation vessel with 0.09 p.b.w. zinc borate and 0.6 p.b.w. calcium dissolved in glycol. After three hours initial ester interchange at 185° C., a polycondensation reaction was carried out for ten hours at 275° C. under a nitrogen atmosphere.

The resulting resin was white and had a melting point of 243° C. and a reduced viscosity of 0.68. It gave strong fibers which could be stretched more than 400% of their original length. A piece of fabric knitted therefrom was dyed with the dispersed acetate dye, "Eastone Fast Red GLF" for two hours at 100° C. using neither a swelling agent nor dye assistants. The material absorbed 162% more dye than unmodified polyethylene terephthalate.

Example 10

97 p.b.w. dimethyl terephthalate, 14 p.b.w. (4.82 mol percent total esters) dimethyl 4,4'-(tetramethylenedisulfonyl)dibenzoate and 110 p.b.w. ethylene glycol were charged into a condensation vessel with 0.09 p.b.w. calcium and 0.08 p.b.w. sodium dissolved in ethylene glycol. After an initial ester exchange reaction at 185° C., the mixture was heated for seven hour to 275° C. for polycondensation according to Example 1.

A light ivory resin, melting at 257° C. and having a reduced viscosity of 0.49, was obtained. The polymer was readily extruded into strong fibers of excellent dyeability.

Example 11

30 p.b.w. dimethyl terephthalate, 3.33 p.b.w. dimethyl 6,6'-(ethylenedisulfonyl)dicaproate (5 mol percent total esters), 33 p.b.w. ethylene glycol, 0.04 p.b.w. magnesium acetate, and 0.0166 p.b.w. tetraisopropyl titanate were placed into a condensation vessel equipped at the bottom for introduction of finely dispersed nitrogen. The initial ester exchange was carried out between 185 and 190° C. over a period of 3.5 hours with continuous removal of methanol by a stream of introduced nitrogen (0.1 liter/min.). After the theoretical amount of methanol was collected in the receiver, the temperature was raised to 240° C. to distill over the excess of glycol over a period of 0.5 hour while passing a 2 liter/min. of nitrogen through the melt. The final polymerization was conducted at 265° C. for 1.5 hours, a small stream of nitrogen (4 liter/min.) again being used.

A tough resin, melting at 246 to 247° C., was obtained, which could be readily extruded into strong fibers. The reduced viscosity of the polyester was 0.40.

Example 12

The general procedure of Example 11 was repeated except that 30 p.b.w. dimethyl terephthalate, 8.05 p.b.w. dimethyl 4,4'-(trimethylenedisulfonyl)ditoluate (10 mol percent total esters), 38 p.b.w. ethylene glycol and 0.0456 p.b.w. magnesium acetate were employed in the polymerization. The ester exchange was conducted at 185 to 190° C. for two hours while a stream of 0.1 liter/min. nitrogen was passed through the melt. Over a period of forty-five minutes the excess glycol was removed at 230 to 240° C. with 3.0 liter/min. nitrogen led through the mixture. The final polymerization was carried out at 270 to 275° C. for 5.5 hours employing a nitrogen stream of 5 liter/min.

A tough resin of excellent fiber-forming and cold-drawing properties was obtained. The reduced viscosity was 0.49 and the melting point was 235 to 236° C.

Example 13

The general procedure of Example 11 was repeated, except that 30 p.b.w. dimethyl terephthalate, 3.32 p.b.w. dimethyl 6,6'-(pentamethylenedisulfonyl)dicaproate (4.5 mol percent total esters), 33 p.b.w. ethylene glycol and 0.034 p.b.w. magnesium acetate were employed in the polymerization.

Ester exchange: 1.5 hour at 185 to 190° C. with 0.1 liter/min. $N_2$
Glycol distillation: 0.7 hour at 230 to 235° C. with 2.5 liter/min. $N_2$
Polycondensation: 7 hours at 270° C. with 3.2 liter/min. $N_2$ The polymer obtained could readily be extruded into strong filaments of excellent cold-drawability. The reduced viscosity of the polymer was 0.56 and its melting point 247 to 248° C. Filaments of this resin showed greatly improved dyeability over unmodified polyethylene terephthalate.

Example 14

The general procedure of Example 11 was repeated, except that 30 p.b.w. dimethyl terephthalate, 1.51 p.b.w. dimethyl 6,6' - (hexamethylenedisulfonyl)dicaproate (2 mol percent total esters), 32 p.b.w. ethylene glycol, 0.0378 p.b.w. magnesium acetate were used in the polymerization reaction.

Ester exchange: 1.2 hours at 185 to 190° C. with 0.1 liter/min. $N_2$
Glycol distillation: 0.5 hour at 235° C. with 2.5 liter/min. $N_2$
Polycondensation: 7.7 hours at 270° C. with 3.2 liter/min. $N_2$ The polyester exhibited excellent fiber-forming properties and attractive dye-receptivity. The reduced viscosity was 0.59 and the melting point 252 to 253° C.

Example 15

The general procedure of Example 11 was repeated, except that 30 p.b.w. dimethyl terephthalate, 2.82 p.b.w. dimethyl 6,6'-(decamethylenedisulfonyl)dicaproate (3.3 mol percent total esters), 33 p.b.w. ethylene glycol, and 0.39 p.b.w. magnesium acetate were charged to the polycondensation vessel.

Ester exchange: 2 hours at 190° C. with 0.1 liter/min. $N_2$
Glycol distillation: ⅔ hours at 235° C. with 2–3 liter/min. $N_2$
Polycondensation: 10⅓ hours at 270° C. with 3.2 liters/min. $N_2$ The polymer obtained was fiber-forming. Its melting point was 258 to 259° C.; its reduced viscosity was 0.60.

Example 16

The general procedure of Example 11 was repeated, except that 30 p.b.w. dimethyl terephthalate, 6.86 p.b.w. dimethyl 4,4'-(3-methylpentamethylenedisulfonyl)ditoluate (8 mol percent total esters), 37 p.b.w. ethylene glycol, and 0.0443 p.b.w. magnesium acetate were employed in the polymerization.

Ester exchange: 2 hours at 185 to 190° C. with 1 liter/min. $N_2$
Glycol distillation: 0.7 hour at 235 to 240° C. with 2 liters/min. $N_2$
Polycondensation: 7 hours at 270 to 275° C. with 4 liters/min. $N_2$ The polyester obtained was fiber-forming. The reduced viscosity of the resin was 0.56 and its melting point 238 to 239° C.

Example 17

The general procedure of Example 11 was repeated, except that 30 p.b.w. dimethyl terephthalate, 2.71 p.b.w. dimethyl 4,4'-(decamethylenedisulfonyl)ditoluate (3 mol percent total esters), 33 p.b.w. ethylene glycol, 0.0393 p.b.w. magnesium acetate, and 0.0163 p.b.w. tetraisopropyl titanate were employed in the polymerization.

Ester exchange: 1.3 hours at 185 to 190° C. with 0.1 liter/min. $N_2$
Glycol distillation: 0.7 hour at 235° C. with 2 liter/min. $N_2$
Polycondensation: 7.7 hours at 265 to 270° C. with 4 liter/min. $N_2$ The polyester obtained was fiber-forming and had a reduced viscosity of 0.48. Its melting point was 252 to 253° C.

Example 18

The general procedure of Example 11 was repeated, except that 30 p.b.w. dimethyl terephthalate, 1.43 p.b.w. dimethyl 6,6'-(3 - methylpentamethylenedisulfonyl)dicaproate (2 mol percent total esters), 32 p.b.w. ethylene glycol, 0.038 p.b.w. magnesium acetate was used in the polymerization.

Ester exchange: 2 hours at 190° C. with 0.1 liter/min. $N_2$
Glycol distillation: ⅔ hour at 235° C. with 2–3 liter/min. $N_2$
Polycondensation: 10⅓ hours at 275° C. with 3.2 liter/min. $N_2$ The polyester obtained could readily be melt-extruded into strong, cold-drawable filaments of improved dye receptivity. The reduced viscosity was 0.56 and the melting point 258 to 259° C.

Example 19

The general procedure of Example 11 was repeated, except that 30 p.b.w. dimethyl terephthalate, 2.08 p.b.w. dimethyl 4,4'-(para-xylylenedisulfonyl)dibutyrate (3 mol percent total esters), 32 p.b.w. ethylene glycol, 0.038 p.b.w. magnesium acetate were charged to the polycondensation reactor.

Ester exchange: 1⅓ hours at 190° C. with 0.1 liter/min. $N_2$
Glycol distillation: ¾ hour at 235° C. with 2.3 liter/min. $N_2$
Polycondensation: 6 hours at 270° C. with 3.4 liter/min. $N_2$ The polyester obtained was extruded into cold-drawable filaments of excellent dyeability. The resin melted at 255 to 256° C. and had a reduced viscosity of 0.62.

Example 20

The general procedure of Example 11 was repeated, except that 30 p.b.w. dimethyl terephthalate, 5.82 p.b.w. dimethyl 4,4'-(para-xylylenedisulfonyl)dibutyrate (8 mol percent), 36 p.b.w. ethylene glycol, 0.043 p.b.w. magnesium acetate were used in the polymerization.

Ester exchange: 1 hour at 190° C. with 0.1 liter/min. $N_2$
Glycol distillation: ¾ hour at 235° C. with 2–3 liter/min. $N_2$ Polycondensation: 7 hours at 270° C. with 4–5 liter/min. N₂

The polymer had excellent fiber-forming properties. Its reduced viscosity was 0.60 and its melting point 243 to 244° C.

*Example 21*

The general procedure of Example 11 was repeated, except that 30 p.b.w. dimethyl terephthalate, 1.55 p.b.w. dimethyl 5,5'-(para-xylylenedisulfonyl)divalerate (2 mol percent total esters), 33 p.b.w. ethylene glycol, and 0.039 p.b.w. magnesium acetate were employed in the polymerization.

Ester exchange: 1.7 hours at 185 to 190° C. with 0.1 liter/min. N₂
Glycol distillation: 0.7 hour at 235° C. with 2.5 liter/min. N₂
Polycondensation: 7 hours at 270° C. with 5 liter/min. N₂

The polymer obtained could readily be extruded into cold-stretchable filaments of excellent strength and dyeability. The melting point of the resin was 256 to 257° C. and its reduced viscosity 0.56.

*Example 22*

The general procedure of Example 11 was repeated, except that 30 p.b.w. dimethyl terephthalate, 5 p.b.w. dimethyl 6,6'-(trimethylenedisulfonyl)dicaproate (7 mol percent), 35 p.b.w. ethylene glycol, and 0.0421 p.b.w. magnesium acetate were used in the polymerization.

Ester exchange: 1.7 hours at 190° C. with 0.1 liter/min. N₂
Glycol distillation: 0.7 hour at 235° C. with 2.5 liter/min. N₂
Polycondensation: 7 hours at 270° C. with 5 liter/min. N₂

The polyester obtained was extruded into cold-drawable filaments of excellent dye-receptivity. The reduced viscosity of the resin was 0.63 and its melting point was 244 to 246° C.

It is to be expected that numerous modifications will readily become apparent to those skilled in the art upon reading this description. All such modifications are intended to be included within the scope of the invention as defined in the appended claims.

I claim:

1. A fiber-forming polymeric linear ethylene terephthalate consisting essentially of recurring structural units of the formulae

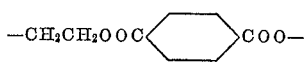

and

—CH₂CH₂OOCRSO₂R'SO₂RCOO— wherein the Rs and R' are divalent hydrocarbon groups containing from two to ten carbon atoms, the proportion of disulfone in the polymer being between about 2 and about 10 mol percent based on the total amount of esters.

2. Product defined in claim 1 wherein the Rs are divalent saturated polymethylene chains.
3. Product defined in claim 1 wherein the Rs are trimethylene radicals.
4. Product defined in claim 1 wherein the Rs are tetramethylene radicals.
5. Product defined in claim 1 wherein the Rs are pentamethylene radicals.
6. Product defined in claim 1 wherein the Rs are radicals of the formula

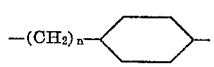

in which *n* is from zero to one.

7. Product defined in claim 1 wherein the Rs are paraphenylene radicals.
8. Product defined in claim 1 wherein the Rs are paratoluene radicals, the methylene groups thereof being attached to the next adjacent sulfone groups.
9. Product defined in claim 1 wherein R' is a divalent saturated polymethylene chain containing from two to ten carbon atoms.
10. Product defined in claim 1 wherein R' is a divalent ethylene radical.
11. Product defined in claim 1 wherein R' is a trimethylene radical.
12. Product defined in claim 1 wherein R' is a tetramethylene radical.
13. Product defined in claim 1 wherein R' is a pentamethylene radical.
14. Product defined in claim 1 wherein R' is a hexamethylene radical.
15. Product defined in claim 1 wherein R' is a decamethylene radical.
16. Product defined in claim 1 wherein R' is a divalent saturated branched chain alkylene radical.
17. Product defined in claim 1 wherein R' is a 3-methylpentamethylene radical.
18. Product defined in claim 1 wherein R' is a dialkylene phenylene radical.
19. Product defined in claim 1 wherein R' is a para-xylylene radical.
20. A polyethylene terephthalate fiber having, as part of the chain and as the sole chain modifying agent therefor, a minor proportion of disulfone units having the formula

—CH₂CH₂OOCRSO₂R'SO₂RCOO— wherein the Rs and R' are divalent hydrocarbon groups containing from two to ten carbon atoms, the proportion of disulfone in the polymer being between about 2 and about 10 mol percent based on the total amount of esters.

21. A dye-receptive fiber of a polyester of reactants consisting essentially of dimethyl terephthalate, ethylene glycol and a disulfonyl diester having the formula

R'[SO₂RCOOCH₃]₂ wherein the Rs and R' are divalent hydrocarbon groups containing from two to ten carbon atoms, the proportion of disulfone in the polymer being between about 2 and about 10 mol percent based on the total amount of esters.

22. Method of preparing a dye-receptive polyester which comprises heating a mixture consisting essentially of dialkyl terephthalate in which the alkyl groups are radicals of alcohols having boiling points below about 200° C., ethylene glycol and between about 2 and about 10 mol percent, based on the total amount of esters, of a disulfone having the general formula

R'[SO₂RCOOCH₃]₂ wherein the Rs and R' are divalent hydrocarbon groups containing from two to ten carbon atoms to a temperature within the range of about 100 to 200° C. until evolution of alcohol is substantially diminished and then heating the reaction mixture to a temperature of the order of about 200 to 300° C. to obtain a fiber-forming melt.

23. A process for preparing modified polyethylene terephthalate polymer containing dye-receptive sulfonyl groups which comprises heating, to a temperature within the range of about 100 to 200° C., a mixture consisting essentially of dialkyl terephthalate in which the alkyl groups are radicals of alcohols having boiling points below about 200° C., ethylene glycol and between about 2 and about 10 mol percent, based on the total amount of esters, of a disulfone having the formula

R'[SO₂RCOOR"]₂ wherein the Rs and R' are divalent hydrocarbon radicals containing from two to ten carbon atoms and the R"s are lower alkyl radicals of alcohols having boiling points below about 200° C. until elimination of alcohol therefrom is substantially complete and continuing the heating to obtain a fiber-forming melt.

24. Method as defined in claim 22 wherein the initial ester interchange and subsequent polycondensation are carried out in the presence of a catalyst.

25. Method as defined in claim 22 wherein the initial ester interchange and subsequent polycondensation are carried out under a nitrogen atmosphere.

26. A process for preparing modified polyethylene terephthalate polymer containing dye-receptive sulfonyl groups which comprises heating, to a temperature within the range of about 100 to 200° C., a mixture consisting essentially of dimethyl terephthalate, between about 2 and about 10 mol percent, based on the total amount of esters, of a disulfone having the formula $$R'[SO_2RCOOR'']_2$$

wherein the Rs and R' are divalent hydrocarbon radicals containing from two to ten carbon atoms and the R''s are lower alkyl radicals of alcohols having boiling points below about 200° C., and from one to ten mols ethylene glycol per combined mol of dimethyl terephthalate and sulfone until elimination of alcohol therefrom is substantially complete and continuing the heating to obtain a fiber-forming melt.

27. A process for preparing modified polyethylene terephthalate polymer containing dye-receptive sulfonyl groups which comprises heating, to a temperature within the range of about 100 to 200° C., a mixture consisting essentially of dimethyl terephthalate, between about 2 and about 10 mol percent, based on the total amount of esters, of a disulfone having the formula $$R'[SO_2RCOOCH_3]_2$$

wherein the Rs and R' are diethylene hydrocarbon radicals containing from 2 to 10 carbon atoms, and from one to ten mols ethylene glycol per combined mol of dimethyl terephthalate and sulfone until elimination of alcohol therefrom is substantially complete and continuing the heating to obtain a fiber-forming melt.

References Cited in the file of this patent

UNITED STATES PATENTS

| | | |
|---|---|---|
| 2,427,640 | Whitehill et al. | Sept. 16, 1947 |
| 2,720,502 | Caldwell | Oct. 11, 1955 |
| 2,744,094 | Caldwell | May 1, 1956 |